(12) United States Patent
Oran et al.

(10) Patent No.: US 7,149,499 B1
(45) Date of Patent: Dec. 12, 2006

(54) SYSTEM FOR DYNAMICALLY TRACKING THE LOCATION OF NETWORK DEVICES TO ENABLE EMERGENCY SERVICES

(75) Inventors: David R. Oran, Acton, MA (US); Silvano Gai, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 636 days.

(21) Appl. No.: 09/908,341

(22) Filed: Jul. 18, 2001

(51) Int. Cl.
H04M 11/04 (2006.01)

(52) U.S. Cl. .............................. 455/404.2; 455/404.1; 455/456.1; 455/456.3; 455/456.5; 455/456.6; 455/457; 455/521; 701/200; 701/207; 701/213

(58) Field of Classification Search ............ 455/404.1, 455/404.2, 407, 408, 414.1, 414.2, 456.1–457, 455/521; 701/200, 207, 213; 370/331, 338
See application file for complete search history.

(56) References Cited

U.S. PATENT DOCUMENTS

| | | | |
|---|---|---|---|
| 3,702,477 A | 11/1972 | Brown | |
| 5,289,527 A * | 2/1994 | Tiedemann, Jr. | 455/435.1 |
| 5,604,765 A * | 2/1997 | Bruno et al. | 375/141 |
| 5,659,617 A * | 8/1997 | Fischer | 380/258 |
| 6,092,096 A | 7/2000 | Lewis | |
| 6,236,849 B1 * | 5/2001 | Reudink et al. | 455/342 |
| 6,266,534 B1 * | 7/2001 | Raith et al. | 455/456.3 |
| 6,308,134 B1 | 10/2001 | Croyle et al. | |
| 6,405,047 B1 * | 6/2002 | Moon | 455/456.1 |
| 6,414,950 B1 * | 7/2002 | Rai et al. | 370/338 |
| 6,580,914 B1 * | 6/2003 | Smith | 455/456.6 |
| 6,611,687 B1 * | 8/2003 | Clark et al. | 340/990 |
| 6,659,947 B1 * | 12/2003 | Carter et al. | 600/300 |
| 6,677,894 B1 * | 1/2004 | Sheynblat et al. | 342/357.1 |
| 2001/0044310 A1 * | 11/2001 | Lincke | 455/456 |
| 2002/0160745 A1 | 10/2002 | Wang | |

OTHER PUBLICATIONS

Garmin, "About GPS", copyrighted 1996-2006 (see last page of document), www.garmin.com/aboutgps, 3 pages.*
Network-Based Application Recognition, Cisco Systems, Inc., (c) 1992-2001, pp. 1-40.
Dixon, Jonathan, Global Reference Navigation for Mobile Robots: Issues in Prtactical Implementation, Mobile Robot Navigation, May 27, 1997, pp. 1-8.
Dixon, J. and Henlich, O., Mobile Robot Navigation, Final Report, Jun. 10, 1997, pp. 1-28.
Davis, C. et al., A Means for Expressing Location Information in the Domain Name System, Network Working Group, Request For Comments: (RFC) 1876, Jan. 1996, pp. 1-15.
Whitaker, J., Radio Frequency Transmission Systems Design and Operation, (c) 1991, pp. i-ix and 375-379.
Grewal, M., Weill, L. and Andrews, A., Global Positioning Systems, Inertial Navigation, and Integration, (c) 2001, pp. iii-vii, 179-224 and 252-264.

* cited by examiner

Primary Examiner—Steve M. D'Agosta
(74) Attorney, Agent, or Firm—Cesari and McKenna LLP

(57) ABSTRACT

A system dynamically discovers the geographic location of entities of a computer network. A network entity is configured to include a location determination engine and a radio frequency (RF) receiver unit. A plurality of RF base stations are disposed in the area proximate to the network entity. Each RF base station has a beacon for transmitting a radio frequency (RF) signal encoded with the location, e.g., the physical coordinates, of the respective RF base station and the time of transmission. The encoded RF signals are received by the RF receiver unit at the network entity and passed to the location determination engine, which uses the received information to compute its location. The location determination engine then reports its location by loading the computed location into a network message and transmitting that message to a central repository.

29 Claims, 6 Drawing Sheets

| NETWORK ENTITY ID | LOCATION | | |
|---|---|---|---|
| | LONGITUDE (DEGREES/ MINUTES/ SECONDS) | LATITUDE (DEGREES/ MINUTES/ SECONDS) | HEIGHT (m) |
| 147 | 71.44.21 | 41.55.09 | 10 |
| 140 | 71.44.19 | 41.55.09 | 10 |
| 150 | 71.44.20 | 41.55.11 | 10 |
| | | | |
| | | | |
| | | | |

SYSTEM FOR DYNAMICALLY TRACKING THE LOCATION OF NETWORK DEVICES TO ENABLE EMERGENCY SERVICES

CROSS-REFERENCE TO RELATED APPLICATION

The present application is related to the following U.S. patent application:

Ser. No. 09/884,239, which was filed on Jun. 19, 2001, by David Oran and Silvano Gai for a SYSTEM FOR DISCOVERING AND MAINTAINING GEOGRAPHIC LOCATION INFORMATION IN A COMPUTER NETWORK TO ENABLE EMERGENCY SERVICES, which is hereby incorporated by reference in its entirety.

BACKGROUND OF THE INVENTION

1. Field of the Invention

This invention relates to computer networks, and more specifically, to a system for dynamically discovering and reporting the location of network entities or devices.

2. Background Information

Computer networks typically comprise a plurality of interconnected network entities. A network entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding network entities to exchange information. For example, a bridge may be used to provide an interconnecting function between two or more LANs. Alternatively, a switch may be utilized to provide a "switching" function for transferring information between a plurality of LANs or end stations. Bridges and switches may operate at various levels or layers of a communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto and driven from the destination port(s) associated with that MAC destination address.

Other network devices, commonly referred to as routers, may operate at higher communication layers, such as layer 3 of the OSI Reference Model, which in TCP/IP networks corresponds to the Internet Protocol (IP) layer. Data frames at the IP layer also include a header which contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks. Many equipment manufacturers include both layer 2 switching and layer 3 routing functions in a single device.

Often, it is desirable to obtain information about where specific network entities, such as end stations, servers, switches, etc., or specific devices are physically located. For example, network administrators may wish to perform inventories on the equipment making up their computer networks. This information can then be used in determining maintenance schedules, among other applications. Currently, only manual systems exist for collecting and storing such information. Specifically, the network administrator would visit each location, write down identifying information for the network equipment at that location and then enter this information in some type of data base, such as a spreadsheet. Because the creations of such manual inventories are so time consuming, they are rarely performed. They are also error-prone, resulting in the data base having incorrect information. As a result, few network administrators have access to such information even though it could facilitate many applications.

Enhanced 911 Emergency Calling Services

Many communities provide enhanced 911 (E911) emergency telephone calling services. With E911, emergency operators receive the location of 911 calls as well as the telephone number from which the call originated. Location information is obtained from an Automation Location Information (ALI) database. Telephone subscriber information, e.g., name, address, telephone number, is typically used to build the ALI database. For organizations using a private branch exchange (PBX) telephone switch, however, subscriber information is often limited to the organization's name and its main address. As a result, the "address" displayed to emergency operators who receive a 911 call from inside a PBX can be imprecise or even far away from the caller's actual location. In this case, the operator must obtain location information from the caller defeating a major purpose of E911 services.

It is an object of the present invention to provide a system for discovering location information for network entities and devices that is neither time-consuming nor error prone.

It is a further object of the present invention to provide a system that can update location information as network entities are moved.

It is still a further object of the present invention to utilize location information in requests for emergency services.

SUMMARY OF THE INVENTION

Briefly, the invention is directed to a system for dynamically discovering and selectively reporting the geographic location of entities of a computer network. In accordance with a preferred embodiment, a network entity, such as a Voice over Internet Protocol (VoIP) telephone, end station, server, intermediate network device, etc., is configured to include a location determination engine and a radio frequency (RF) receiver unit. A plurality of RF base stations are disposed in the area proximate to the network entity. Each RF base station has a beacon for transmitting a radio frequency (RF) signal encoded with the location, e.g., the physical coordinates, of the respective RF base station and the time of transmission. The encoded RF signals are received by the RF receiver unit at the network entity and passed to the location determination engine. Using the information encoded within the received RF signals, the location determination engine computes its location, e.g., its physical coordinates, such as longitude, latitude and height, by employing triangulation or other techniques. The location determination engine then loads its computed location along with its identity into a network message and transmits the message to a central repository for storage.

If the network entity is moved to a new location in the computer network, the procedure is repeated and the new location of the network entity is sent to and stored at the central repository in place of the previous location information, which is now stale.

If an emergency call, such as a 911 call, is made from the network entity, the entity's location information is retrieved from the central repository and appended to the call. As a result, emergency personnel are provided with accurate location information of the specific network entity from which the emergency call was placed. The location information can be retrieved by the network entity itself as part of the emergency call procedure or by one or more intermediate network device's used to route the call to the emergency personnel.

In an alternative embodiment, the network entity may be configured to include a RF transmitter only. In this case, a plurality of receivers are spaced about the area in which the network entity is located. The receivers capture the signal from the transmitter and use triangulation or other techniques to compute the location of the network entity. In yet another embodiment, the network entity includes a RF transceiver. A centrally disposed RF base station transmits a call signal along a single radial from the base station. Network entities located along the selected radial receive the call signal, and are configured to respond to it with response signals. Based on the amount of time it takes the response signals to be received, the base station can determine how far out along the selected radial the network entities are located, and thus their positions. The base station then selects a new radial from which to transmit the call signal and the process is repeated.

BRIEF DESCRIPTION OF THE DRAWINGS

The invention description below refers to the accompanying drawings, of which:

FIG. 5 is a highly schematic diagram of a data structure in accordance with the present invention.

DETAILED DESCRIPTION OF AN
ILLUSTRATIVE EMBODIMENT

Figure 1:
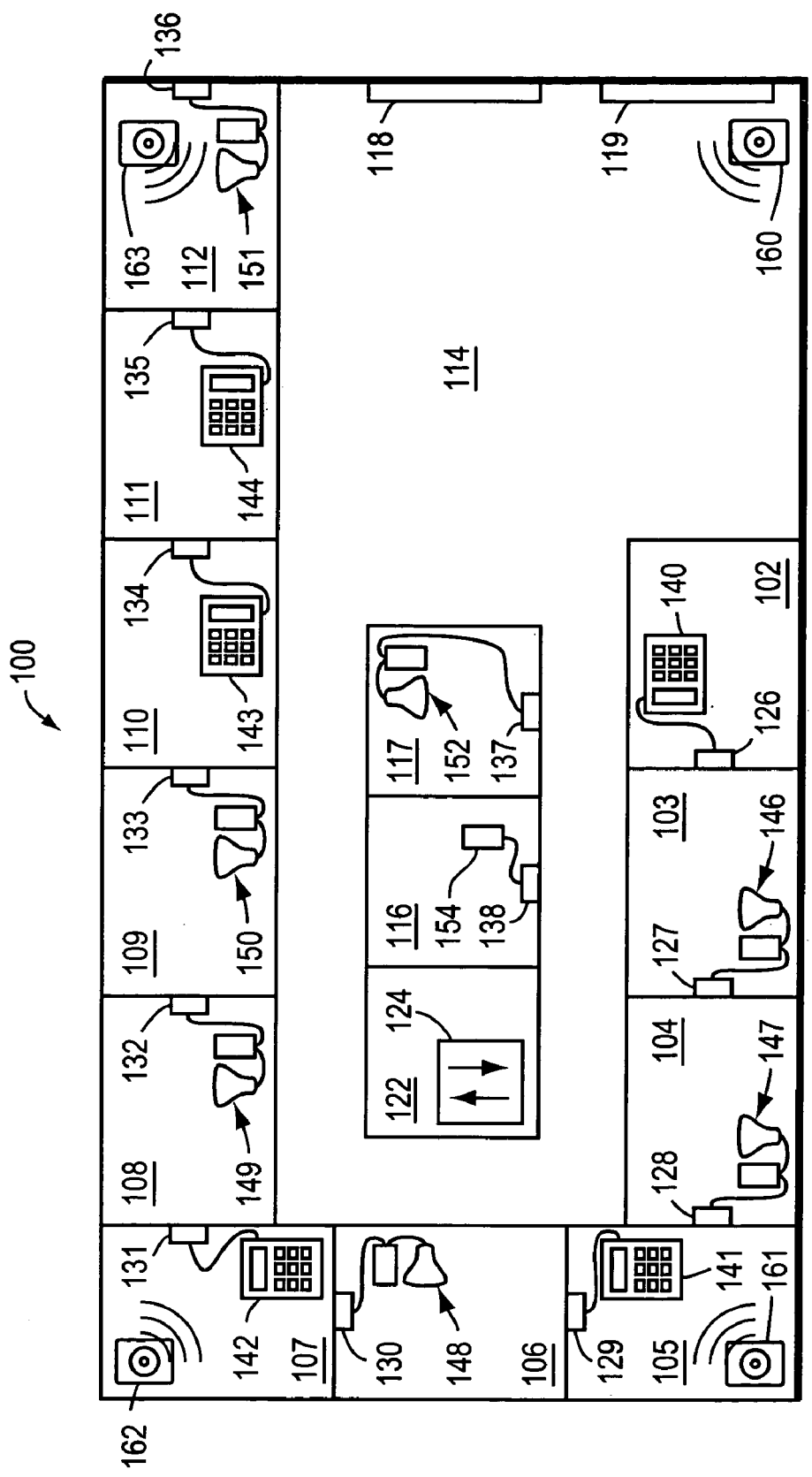
FIG. 1 is a plan view of the layout of an office area in which the present invention may be advantageously utilized.

FIG. 1 is a plan view of an exemplary office layout 100. The office layout 100 includes a plurality of offices 102–112, a lobby 114 and two cubicles 116–117. Disposed along an exterior wall of the lobby 114 are two windows 118–119. The office layout 100 further includes a wiring closet 122. Located within the wiring closet 122 are one or more intermediate network devices, such as a network switch 124. Disposed within each office 102–112 and within each cubicle 116–117 is a network connector or outlet 126–138. The network outlets 126–138 are all radially wired to the wiring closet 122 in a conventional manner. In particular, each outlet 126–138 is preferably coupled to a respective port of the network switch 124.

Also disposed within each office 102–112 and within each cubicle 116–117 is one or more network entities that are connected to the respective outlet 126–138. For example, disposed within offices 102, 105, 107, 110 and 111, is a Voice over Internet Protocol (VoIP) telephone 140–144. Disposed within offices 103, 104, 106, 108, 109, 112 and within cubicle 117 is an end station, such as a personal computer (PC) or workstation 146–152. Each PC or workstation may include a monitor and a base unit. The PCs 146–152 may be running one or more communication applications, such as NetMeeting from Microsoft Corp. of Redmond, Wash. Disposed in cubicle 116 is a server 154. Switch 124, moreover, provides a switching or interconnection function among its various ports so as to create a computer network from the network entities coupled to outlets 126–138, and to provide interconnection with other networks via conventional routing and bridging technologies.

Disposed about the office layout 100, at least temporarily, are a plurality of base stations 160–163. In the preferred embodiment, the base stations are located around the periphery of the office 100. Each base station 160–163 is configured to transmit a radio beacon signal at a selected radio frequency. The radio beacon signals can be transmitted continuously or in pulses. Encoded within the radio beacon signals is the location or position, i.e., the physical coordinates, of the respective base station. The physical coordinates of the base stations 160–163 may be obtained by use of a Global Positioning System (GPS) receiver. For example, a GPS receiver (not shown) may be included at each base station 160–163. Alternatively, a GPS receiver may be brought to each base station and a corresponding location obtained and stored at the respective base station. Other suitable means for deriving the locations of the base stations 160–163 may also be used, such as measuring the distance of the base stations from known datum point(s), etc.

Each base station 160–163 may include a synchronized clock or timing source and, for continuous beacon signals, be configured to transmit its beacon signal in phase with the beacon signals from the other base stations. If the beacon signals are transmitted in pulses, they may be further encoded with the time of the respective pulse. Furthermore, each base station may be configured to pulse its radio beacon signal at a different rate. Base station 160, for example, may transmit its signal every 10 milliseconds (ms), while base station 161 transmits its beacon signal every 20 ms.

Furthermore, each base station 160–163 may be configured to transmit its radio beacon signal at a different frequency. Base station 160, for example, may transmit its signal at 110.6 MHz, while base station 161 transmits its beacon signal at 111.2 MHz. The base stations 160–163 may be configured as LORAN-C or Very High Frequency (VHF) Omnidirectional Range (VOR) navigation-type transmitters which are both well-known to those skilled in the art for use in deriving position information.

Figure 2:
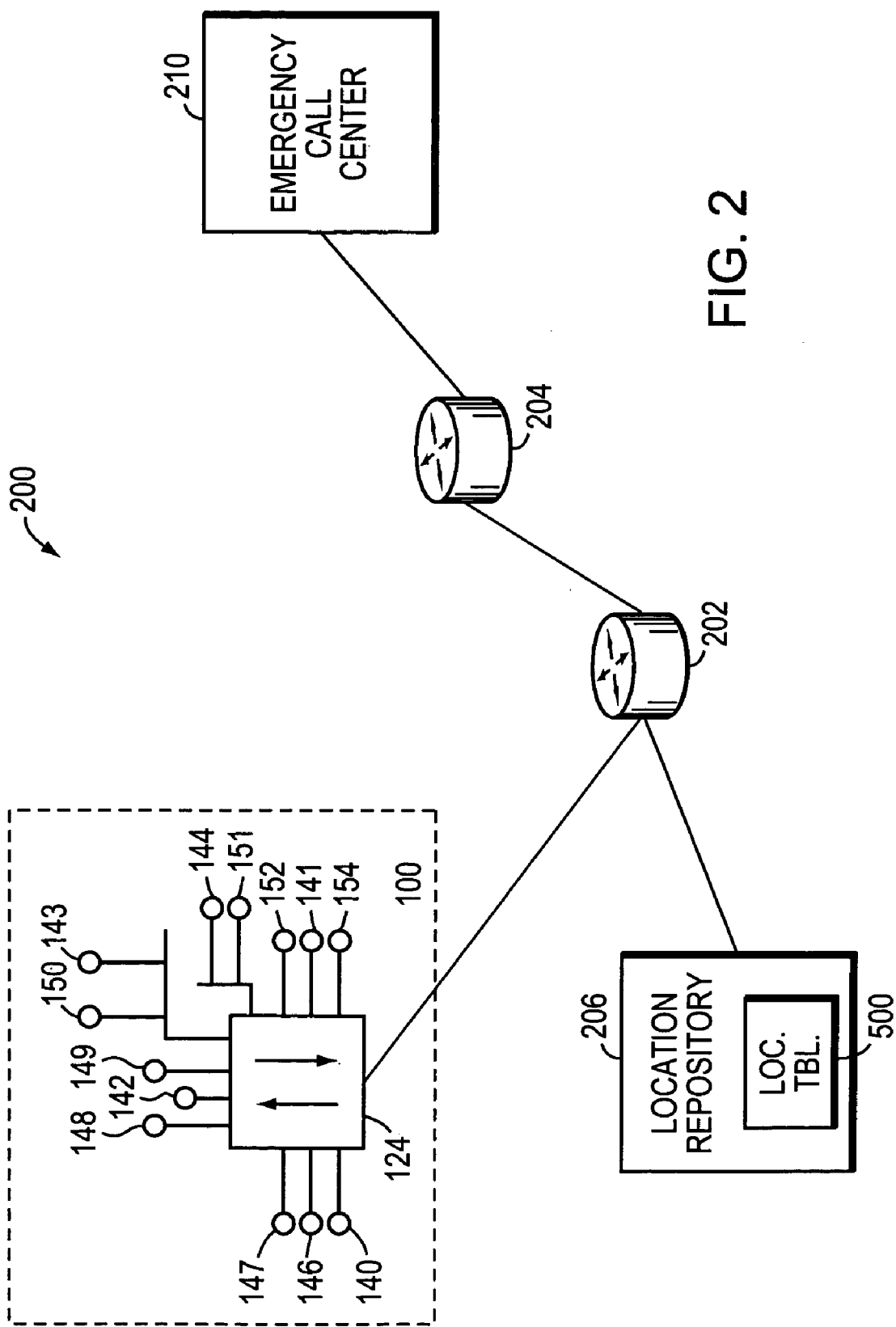
FIG. 2 is a highly schematic diagram of a computer network, including the office area of FIG. 1.

FIG. 2 is a highly schematic illustration of a computer network 200 which includes the network formed by switch 124 and network entities 140–144, 146–152 and 154. Computer network 200 further includes a plurality of intermediate network devices, such as routers 202 and 204. Switch 124 is coupled to router 202, which, in turn, is coupled to router 204. Computer network 200 further includes one or more location repositories, such as location repository 206 which is also coupled to router 202. Location repository 206, which may be a server, has one or more data stores or structures, such as location table 500, for storing location information that has been computed for entities of network 200, as described herein. Computer network 200 further includes or is in communicating relationship with an emergency call center 210 that is staffed by emergency personnel.

Figure 3:
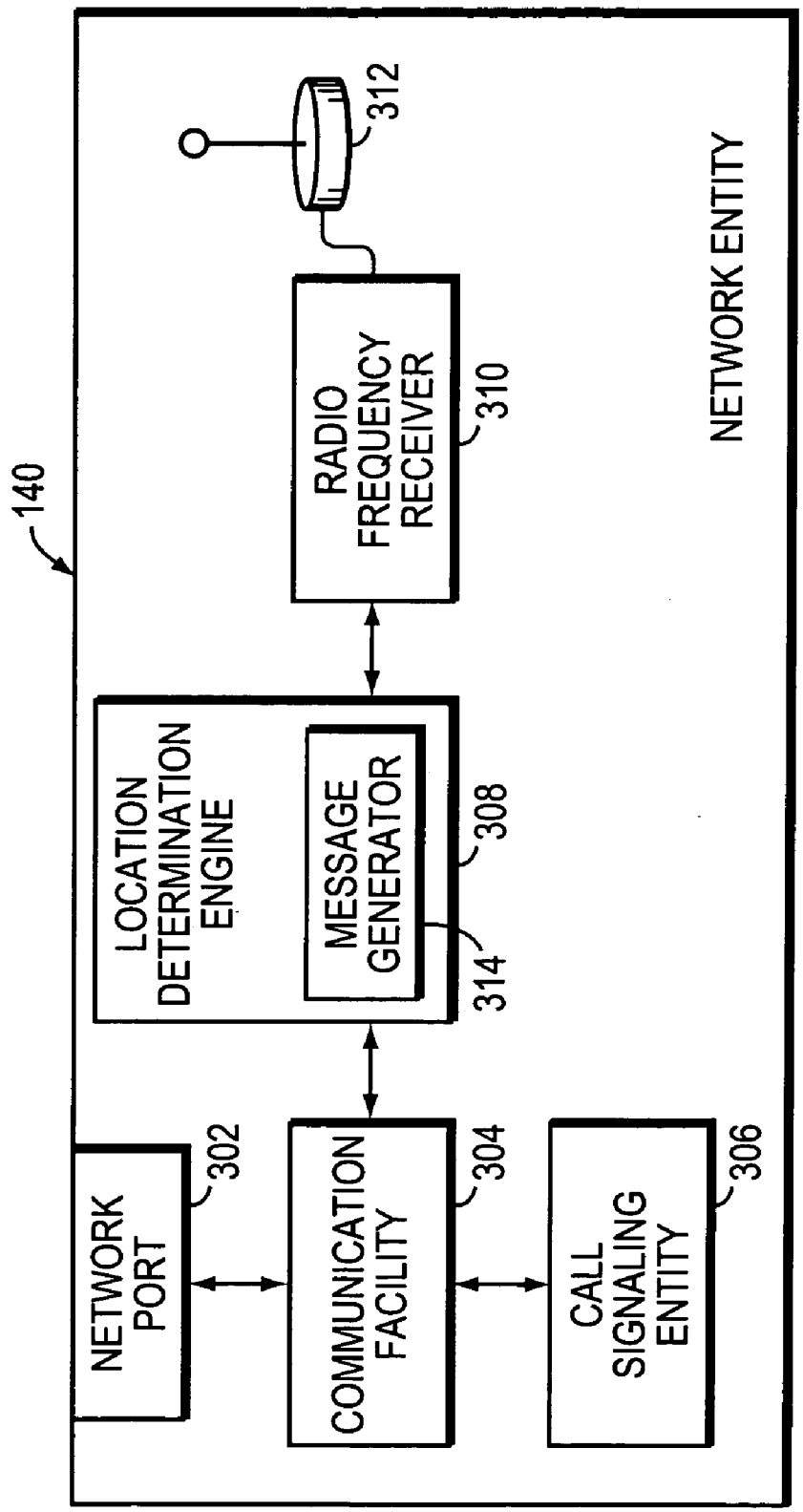
FIG. 3 is a highly schematic diagram of a network entity in accordance with the present invention.

FIG. 3 is a highly schematic, partial block diagram of a network entity, such as VoIP phone entity 140. Network entity 140 preferably includes a network port 302, a communication facility 304 and a call signaling entity 306. The call signaling entity 306 preferably operates in accordance with a known call signaling protocol, such as H.323, Session Initiation Protocol (SIP), Media Gateway Control Protocol (MGCP) or MEGACO, which is an alternative to MGCP, among others.

In accordance with the present invention, network entity 140 further includes a location determination engine 308 and a radio frequency (RF) receiver 310. Coupled to the RF receiver 310 is an antenna 312. The communication facility 304 is in communicating relationship with the network port 302 so that messages may be exchanged between the network entity 140 and various entities of the computer network 200 of FIG. 2. The call signaling entity 306 and the location determination engine 308 are in communicating relationship with the communication facility 304 so that they can send and receive messages via network 200. Indeed, the location determination engine 308 may include a message generator component 314 for use in generating location messages as described herein. Location determination engine 308 is also in communicating relationship with the RF receiver 310 so that signals captured on the antenna 312 or the information encoded therein can be passed to engine 308 for processing.

The communication facility 304 preferably includes one or more software libraries for implementing a communication protocol stack, thereby allowing network entity 140 to exchange messages with other entities of network 200. The communication facility 304 may, for example, include software layers corresponding to the Transmission Control Protocol/Internet Protocol (TCP/IP) communication stack, although other communication protocols, such as Asynchronous Transfer Mode (ATM) cells, the Internet Packet Exchange (IPX) protocol, the AppleTalk protocol, the DECNet protocol and/or NetBIOS Extended User Interface (NetBEUI) could be utilized. The communication facility may also include an ad hoc protocol that is specifically designed to carry location information as described herein directly the LAN, such as a simple periodic broadcast/multicast over Ethernet protocol. Communication facility 304 and/or network port 302 further includes transmitting and receiving circuitry and components, such as a network interface card (NIC), that establishes a physical port for exchanging data packets and frames with switch 124 to which network entity 140 is connected.

Location determination engine 308 may comprise registers and combinational logic configured and arranged to produce sequential logic circuits. However, in the preferred embodiment, engine 308 comprises software programs or modules containing program instructions pertaining to the methods described herein. The program instructions may be disposed on a computer readable media for execution by one or more processing elements disposed at entity 140. Nonetheless, those skilled in the art will recognize that various combinations of software and hardware may be utilized to carry out the objects of the present invention.

The RF receiver 310 and antenna 312 are configured and/or tuned so as to capture the beacon signals transmitted by the base stations 160–163. The RF receiver further includes circuitry, such as filters, amplifiers, analog signal processing circuitry, analog-to-digital (A/D) converters, etc., for extracting the location and either the phase or timing information encoded in the beacon signals, digitizing that information and providing the digital data to the location determination engine 308 for analysis.

Suitable radio transmitter and receivers for use with the present invention are available from Motorola, Inc. of Schaumburg, Ill., and Dataradio Corp. of Atlanta, Ga., among others.

Figure 4A:
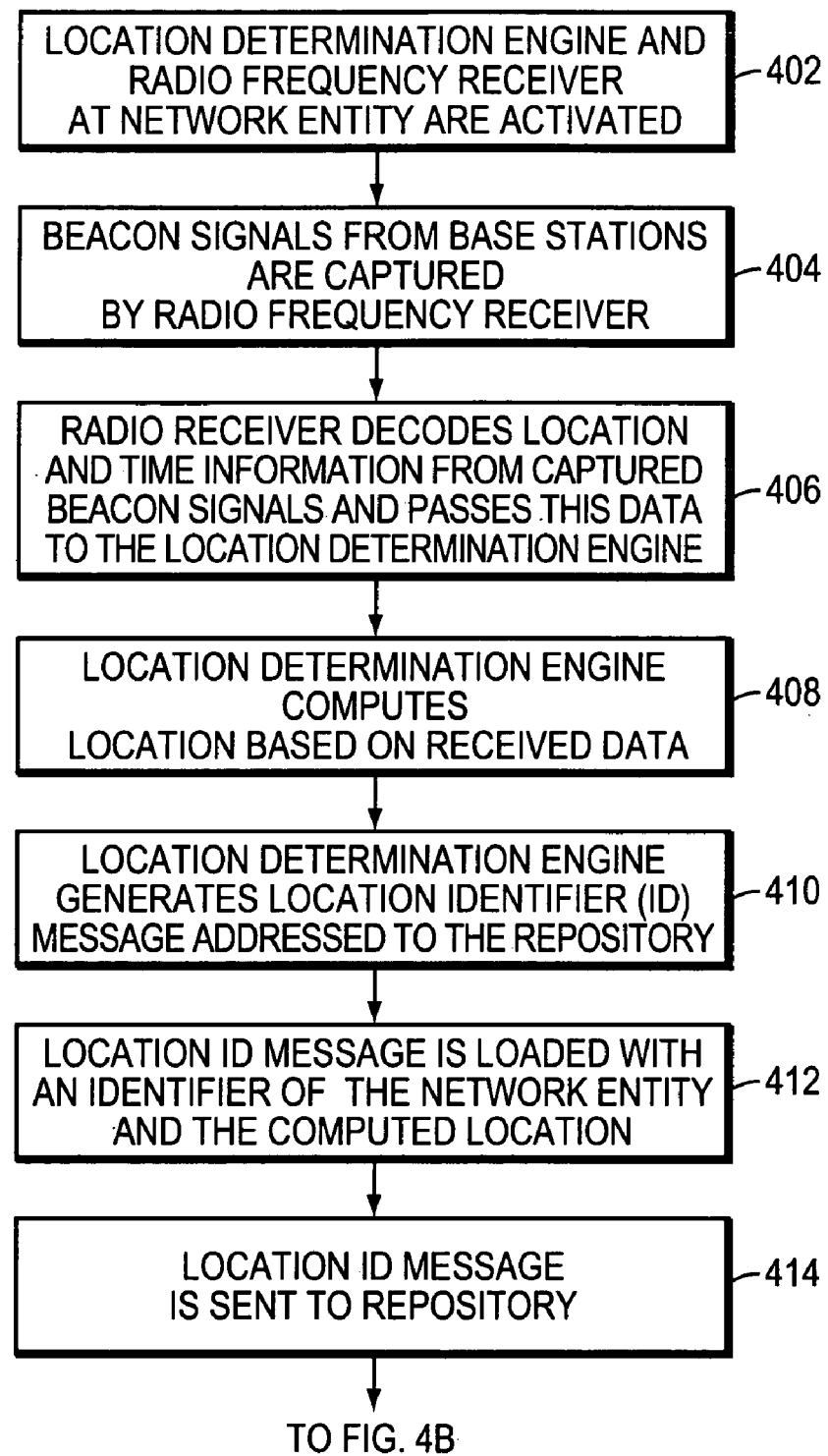
FIGS. 4A–B are a flow diagram of the method of the present invention.
Figure 4B:
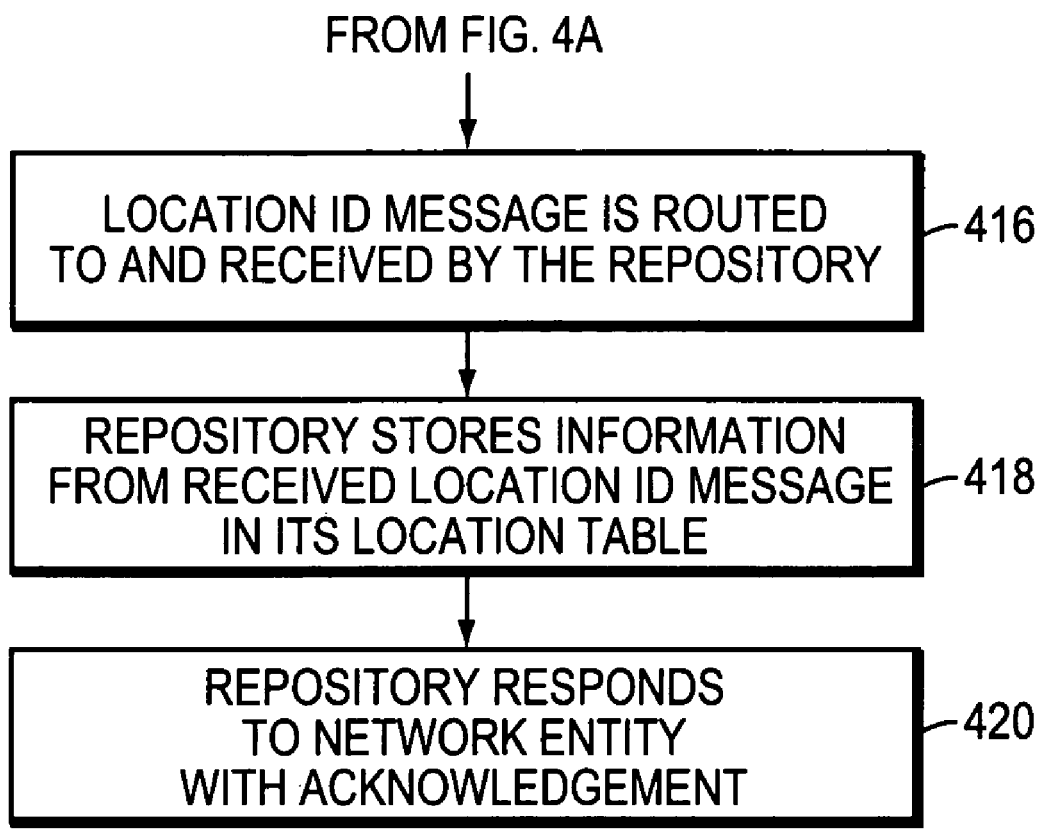

FIGS. 4A–B are a flow diagram of the method of the present invention. First, the location determination engine 308 (FIG. 3) and RF receiver 310 of a selected network entity, e.g., entity 147 (FIG. 1), are activated, as indicated at block 402. In the preferred embodiment, a network entity activates its location determination engine 308 and RF receiver 310 during the first initialization of the entity after it has been connected (e.g., plugged in) to its power source. Signals transmitted by the base stations 160–163 are captured by the antenna 312 of entity 147 and passed to the RF receiver 310, as indicated at block 404. The RF receiver 310 decodes the location and the phase or timing information from the captured beacon signals, and passes this information as digital data to the location determination engine 308, as indicated at block 406. The RF receiver 310 may also note the time at which each beacon signal was received, and provide this information to engine 308 as well. The location determination engine 308 then computes its location within office layout 100, based on the information decoded from the RF signals transmitted by the base stations 160–163 and captured by entity 147, as indicated at block 408. As the RF signals from the base stations 160–163 include their locations and are transmitted in phase and/or with their times of transmission, the location determination engine 308 at entity 147 can use well-known triangulation and/or trilateration operations or equations to compute its position. This information may be computed in the form of longitude (in degrees, minutes and seconds), latitude (in degrees, minutes and seconds) and height above sea level (in meters). Nonetheless, those skilled in the art will recognize that other units may be used. Another possibility is to have a different set of transmitters on each floor and to encode the beacon signals of each set with a floor number (e.g., floor 2, floor 3, etc.).

The message generator 314 of the location determination engine 308 then generates a location identifier (ID) message that is addressed to the location repository 206 (FIG. 2), as indicated at block 410. Preferably, the location ID message is encapsulated in accordance with the well-known User Datagram Protocol (UDP) which is a connection-less transport layer protocol. In the destination port field of the UDP message, message generator 314 preferably loads a transport layer port number that is associated with the repository 206. The UDP message, in turn, is encapsulated within an Internet Protocol (IP) message, and message generator 314 loads the IP address of the repository 206 into the destination IP address field of the IP message. Network entity 147 and/or engine 308 may be preconfigured with the network address or name of repository 206 or it may obtain the address through a discovery protocol, such as Simple Network Management Protocol (SNMP), Cisco Discovery Protocol (CDP), etc. Alternatively, the message generator 314 may utilize a selected broadcast or multicast group destination address and the repository 206 may be configured to listen to all messages directed to the selected broadcast or multicast group address.

It should be understood, however, that other message formats may be used. For example, the network message may comply with the Transmission Control Protocol (TCP) layer of the TCP/IP Reference Model, or the network message may simply be an IP message.

The location ID message is loaded with an identifier corresponding to entity 147, such as its Media Access Control (MAC) and/or IP address, and the computed location of entity 147, as indicated at block 412. The location information may be in the form specified in Request for Comments (RFC) 1876 entitled *A Means for Expressing Location Information in the Domain Name System*, which is hereby incorporated by reference in its entirety. The location determination engine 308 then passes the location ID message to the communication facility 304 which drives it via network port 302 onto the network 200, as indicated at block 414. The location ID message, which is routed through the network by the intermediate network devices, is received at the location repository 206, as indicated at block 416 (FIG. 4B). Location repository 206 takes the information from the received location ID message and stores it in its location table 500, as indicated at block 418.

FIG. 5 is a highly schematic illustration of location table 500. Table 500 has a plurality of columns, including a network entity ID column 502 and a location column 504, and a plurality of rows 506*a*–*f* whose intersections define cells or records for storing information. The location column 504, moreover, is preferably subdivided into a longitude column 508, a latitude column 510 and a height column 512.

Upon receiving the location ID message, the location repository 206 creates a new entry, e.g., row 506*a*, in table 500. Repository 206 the loads the ID of the network entity, i.e., entity 147, that sourced the message into the cell of row 506*a* that corresponds to column 502. The computed longitude is stored at the cell corresponding to column 506, while the computed latitude and height are stored at the cells corresponding to columns 508, 510.

Each network entity at the office layout 100 preferably performs this same process, and the location repository 206 populates the entries and cells of table 500 with the received information. Table 500 thus contains location information for each network entity.

Alternatively, the location information computed by the network entities may be stored at a data structure maintained by one or more intermediate network devices, such as switch 124, as described in the commonly owned, copending patent application assigned Ser. No. 09/884,239 and entitled System for Discovering and Maintaining Geographic Location Information in a Computer Network to Enable Emergency Services, filed Jun. 19, 2001, which is hereby incorporated by reference in its entirety.

The location repository 206 may be configured to return an acknowledgement message to network entity 147 in response to receiving the location ID messages without error, as indicated at block 420.

Suppose one or more of the network entities is moved from its current location to a new location. In particular, suppose that network entity 150 is relocated from office 109 to an office in an entirely different office layout. Once network entity 150 has been installed in its new location, as part of its initialization, the location determination engine 308 and RF receiver 310 are activated causing beacon signals to be captured and engine 308 to compute its new location, as described above. This new location information is then loaded into a location ID message and sent to the location repository 206. The repository 206 searches its location table 500 using the identity of network entity 150 as contained in the location ID message. In this case, repository 206 finds matching entry 506*c*. The repository 206 then replaces the prior location information stored in the cells of row 506*c* corresponding to columns 506, 508, 510 with the new information contained in the received message. The location of network entities is thus dynamically updated as they are moved around the offices and work areas of a given organization.

Such an organization may permanently place sufficient base stations throughout its facilities to permit all of the network entities to compute their locations. The location determination engines 308 may be configured to compute a new location every few days or weeks as appropriate. Alternatively, the organization may periodically move base stations throughout its facilities, and the location determination engines 308 may be configured to compute a new location in response to receiving beacon signals from the transmitting base stations. In this embodiment, the base stations 160–163 may be periodically, e.g., every month, moved through the organization's facilities, thereby triggering the network entities to recompute their locations and send that information to the repository 206.

The location information stored in the repository 206 can be used by network administrators and others to keep track of an organization's equipment and inventory. It can also be used during enhanced 911 emergency calls. Back-up repositories may be established within network 200 and/or the storage of computed locations may be distributed across several repositories.

The base stations 160–163 can be configured to transmit their respective beacon signals in all directions at the same time, i.e., they can be configured as omnidirectional beacons. Alternatively, they can be configured to transmit their beacon signals along a single radial from the respective base station. The radial, moreover, can be changed, e.g., by 1, 5, 10 degrees, etc. such that each base station effectively "sweeps" its beacon signal through 360°. In addition to location information, these radial beacon signals can be encoded with the angle between the selected radial and a standard datum, such as true north or magnetic north. By using radials encoded with their angles, network entities can compute their locations from at least two beacon signals. A third beacon signal would be necessary to compute a height value.

Those skilled in the art will understand that the location of the base stations, the time at which the beacon signals are transmitted and the angle of the radial can be encoded in the beacon signals in many ways. For example, frequency modulation (FM) can be used to encode the location of the base station into the carrier beacon signal, and phase modulation (PM) can be used to encode the angle of the radial.

Rather than using radio signals in the VHF range, the base stations and receivers could be configured to use signals in other ranges, such as the Ultra High Frequency (UHF) range or the 900 Megahertz (MHz) range, among others. They may also be configured to use Single Side Band (SSB) transmission mode with either the Upper Side Band (USB) or the Lower Side Band (LSB), or multiple side bands and one or more carrier waves as in Amplitude Modulation (AM) radio transmissions. The base stations and receivers could also be configured to use Ultra Wideband Radio (UWB) technology.

It should be understood that the computed location information may be sent additionally or alternatively to a network management station via a management protocol, such as SNMP, or to an intermediate network device via a discovery protocol, such as CDP. The computed location information can also be added to one or more Dynamic Host Configuration Protocol (DHCP) messages transmitted by a network entity to a DHCP host. One or more intermediate network devices, moreover, could be configured to snoop such DHCP messages and to retrieve and store the location information contained therein.

Emergency 911 Calls

Suppose, for example, that a user places a 911 call to the emergency call center 210 from a VoIP telephone or workstation in one of the offices, e.g., from workstation 146 located in office 103. The "call" is digitized, loaded into a plurality of packets and sent on the network 200 via the call signaling entity 306 of workstation 146. These packets are received, at least initially, by switch 124. Switch 124 is preferably configured with circuitry and/or software for detecting the initialization of a 911 call, such as a suitably programmed Network-Based Application Recognition (NBAR) engine from Cisco Systems, Inc., which is described in *Overview Network-Based Application Recognition*, posted by Cisco Systems, Inc. on Aug. 24, 2000, and hereby incorporated by reference in its entirety. In response to detecting a 911 call, switch 124 issues a query to the repository 206 seeking the location of the calling entity, i.e., workstation 146. Repository 206 performs a look-up on table 500 and responds to the switch 124 with the location of workstation 146. The switch 124 then appends the location information to the 911 "call" which is routed to the emergency call center 210. The dispatcher at the emergency call center 210 is thus presented with the caller's location along with the 911 call, and can thus direct the delivery of emergency services to the precise location, i.e., office 103.

It should be understood that the call signaling entity 306 of workstation 146 may be configured to retrieve the location information from repository 206 and append it to the 911 call itself. The call signaling entity 306 could obtain this information at the time the 911 call is being made by using one or more special Internet Control Message Protocol (ICMP) messages. Alternatively, the location determination engine 308 could be configured to retain or store a copy of its computed location. In this case, the call signaling entity 306 obtains the location information from engine 308 and appends it to one or more of the packets corresponding to the 911 call.

It should be understood that other embodiments of the present invention are possible. For example, the RF receiver 310 at each network entity could be replaced with a RF transmitter. The RF transmitter would pulse radio beacon signals encoded with the time of each pulse. These signals would be captured by the base stations which could then cooperate with each other to compute the locations of the transmitting entities using triangulation or other techniques. The RF receiver 310 could also be replaced with a receiver/transmitter or transceiver unit. In this case, a base station would be centrally disposed in the office layout. The base station would issue a call signal along a selected radial. Each network entity disposed along this radial from the base station would receive the signal and reply with a response signal. By determining how long from the transmission of the call signal it takes the base station to receive the response signals, the base station can compute how far out along the selected radial each network entity is located. Knowing the angle of the radial relative to some datum, such as true or magnetic north, the base station can thus determine the location of each responding network entity. The base station then increments (or decrements) the angle of the radial by some value (e.g., 1 degree, 5 degrees, etc.) and repeats the process until it has issued radial beacons signals through a complete circle about the base station.

It should be further understood that the present invention will also work with network entities employing wireless technologies, such as network-capable cellular telephones. That is, one or more of the network entities may communicate with the network 200 through a wireless medium, such as microwaves, cellular telephone signals, etc.

The foregoing description has been directed to specific embodiments of this invention. It will be apparent, however, that other variations and modifications may be made to the described embodiments, with the attainment of some or all of their advantages. Those skilled in the art will recognize that other combinations are also possible. Therefore, it is an object of the appended claims to cover all such variations and modifications as come within the true spirit and scope of the invention.

What is claimed is:

1. A network entity configured to source and/or sink messages in a computer network, the network entity comprising:
   a location determination engine;
   a radio frequency (RF) receiver in communicating relationship with the location determination engine, the RF receiver configured to capture beacon signals transmitted by a plurality of base stations, the beacon signals encoded with location information of the respective base stations, the location information of a particular base station having longitude and latitude and height of the particular base station, the height including an indication of a floor of a building;
   the location determination engine configured to decode the longitude and latitude of the plurality of base stations from received beacon signals, and to compute a longitude and latitude location of the network entity in response to longitude and latitude of the plurality of base stations by comparison of a time of transmission of each beacon signal with a time of reception of that beacon signal at the network entity and determination there from of a distance that beacon signal has traveled; and
   the location determination engine further configured to compute a floor of the building location of the network entity, in response to the floor of the building height information of the plurality of base stations encoded in the beacon signals.

2. The network entity of claim 1, further comprising:
   a communication facility in communicating relationship with the location determination engine, the communication facility configured to send and receive messages to and from the computer network.

3. The network entity of claim 2, wherein the location determination engine is further configured to generate one or more location identifier (ID) messages that contain the latitude, longitude, and floor of the building location for the network entity, the location ID messages to be transmitted by the communication facility.

4. The network entity of claim 3, wherein the location identifier (ID) messages are further configured to be received by one or more location repositories having a location table that stores latitude, longitude, and floor of the building locations of a plurality of different network entities of the computer network.

5. The network entity of claim 2, further comprising:
   a call signaling entity configured to initiate a call from the network entity to another network entity, the call signaling entity in communication relationship with the communication facility.

6. The network entity of claim 5, wherein the call signaling entity is further configured to append the network entity's latitude, longitude, and floor of the building location to the call.

7. The network entity of claim 6, wherein the call is an emergency call.

8. The network entity of claim 1, wherein the location determination engine is configured to detect that the network entity has been moved and, in response, to compute a new latitude, longitude, and floor of the building location for the network entity.

9. The network entity of claim 1, wherein the beacon signals are transmitted according to a technique selected from the group consisting of: continuous transmission; continuous transmission in phase; transmission in pulses; transmission in pulses with different pulse rates for each base station; and transmission at different frequencies for each base station.

10. The network entity of claim 1, wherein the beacon signals are transmitted as Loran signals.

11. The network entity of claim 1, wherein the beacon signals are transmitted as very high frequency (VHF) omnidirectional range (VOR) signals.

12. The network entity of claim 1, wherein the network entity is selected from the group consisting of: a personal computer; a server; a router; a switch; and a Voice over Internet Protocol (VoIP) telephone device.

13. The network entity of claim 1, wherein wherein the beacon signals are transmitted as very high frequency (VHF) omnidirectional range (VOR) signals.

14. A method for operating a network entity, comprising:
receiving radio frequency (RF) beacon signals transmitted by a plurality of base stations, the beacon signals encoded with location information of the respective base stations and a time of transmission of the beacon signals, the location information of a particular base station having longitude and latitude and height of the particular base station encoded therein, the height including an indication of a floor of a building;
computing a longitude and latitude location of the network entity in response to longitude and latitude of the plurality of base stations and time of transmission of the received beacon signals, the longitude and latitude of the plurality of base stations decoded from the received beacon signals;
computing a floor of the building location of the network entity in response to the floor of the building of the plurality of base stations encoded in the beacon signals;
transmitting the latitude, longitude, and floor of the building location in a message, the message transmitted over a computer network.

15. A method for operating a network entity, comprising:
receiving radio frequency (RF) beacon signals transmitted by a plurality of base stations, the beacon signals encoded with location information of the respective base stations, the location information of a particular base station having longitude, latitude and an indication of a floor of a building of the particular base station encoded therein;
computing a longitude and latitude location of the network entity in response to longitude and latitude of the plurality of base stations by comparing a time of transmission of each beacon signal with a time or reception of that beacon signal at the network entity and determining there from a distance that beacon signal has traveled, the longitude and latitude of the plurality of base stations decoded from the received beacon signals;
computing the floor of the building where the network entity is located in response to the floor of the building of the plurality of base stations encoded in the beacon signals;
transmitting the latitude, longitude, and floor of the building location in a message, the message transmitted over a computer network.

16. The method of claim 15, wherein the step of transmitting further comprises:
directing the message to one or more location repositories having a location table that stores the latitude, longitude, and floor of the building locations of a plurality of different network entities of the computer network.

17. The method of claim 15, further comprising the step of:
initiating a call from the network entity to another network entity.

18. The method of claim 15, further comprising the step of:
appending the network entity's latitude, longitude, and floor of the building location to the call.

19. The method of claim 18, wherein the call is an emergency call.

20. The method of claim 15, further comprising the step of:
detecting that the network entity has been moved and, in response, computing a new latitude, longitude, and floor of the building location for the network entity.

21. The method of claim 15, wherein the beacon signals are transmitted according to a technique selected from the group consisting of: continuous transmission; continuous transmission in phase; transmission in pulses; transmission in pulses with different pulse rates for each base station; and transmission at different frequencies for each base station.

22. The method of claim 15, wherein the beacon signals are transmitted as Loran signals.

23. The method of claim 15, wherein the network entity is selected from the group consisting of: a personal computer; a server; a router; a switch; and a Voice over Internet Protocol (VoIP) telephone device.

24. A network entity, comprising:
means for receiving radio frequency (RF) beacon signals transmitted by a plurality of base stations, the beacon signals encoded with location information of the respective base stations and a time of transmission of the beacon signals, the location information of a particular base station having longitude and latitude and height of the particular base station encoded therein, the height including an indication of a floor of a building;
means for computing a longitude and latitude location of the network entity in response to longitude and latitude of the plurality of base stations and time of transmission of the received beacon signals, the longitude and latitude of the plurality of base stations decoded from the received beacon signals;
means for computing a floor of the building location of the network entity in response to the floor of the building of the plurality of base stations encoded in the beacon signals;
means for transmitting the latitude, longitude, and floor of the building location in a message, the message transmitted over a computer network.

25. A network entity, comprising:

means for receiving radio frequency (RF) beacon signals transmitted by a plurality of base stations, the beacon signals encoded with location information of the respective base stations, the location information of a particular base station having longitude and latitude and height of the particular base station encoded therein, the height including an indication of a floor of a building;

means for computing a longitude and latitude location of the network entity in response to longitude and latitude of the plurality of base stations by comparing a time of transmission of each beacon signal with a time or reception of that beacon signal at the network entity and determining there from a distance that beacon signal has traveled, the longitude and latitude of the plurality of base stations decoded from the received beacon signals;

means for computing a floor of the building location of the network entity in response to the floor of the building of the plurality of base stations encoded in the beacon signals;

means for transmitting the latitude, longitude, and floor of the building location in a message, the message transmitted over a computer network.

26. The network entity of claim 25, further comprising:

means for directing the message to one or more location repositories having a location table that stores the latitude, longitude, and floor of the building locations of a plurality of different network entities of the computer network.

27. The network entity of claim 25, further comprising:

means for initiating an emergency call from the network entity to another network entity and appending the networks entity's latitude, longitude, and floor of the building location to the emergency call.

28. A computer readable medium containing executable program instructions for operating a network entity, the executable program instructions comprising program instructions configured to:

receive radio frequency (RF) beacon signals transmitted by a plurality of base stations, the beacon signals encoded with location information of the respective base stations, the location information of a particular base station having longitude, latitude and an indication of a floor of a building of the particular base station encoded therein;

compute a longitude and latitude of the network entity in response to longitude and latitude of the plurality of base stations by comparing a time of transmission of each beacon signal with a time or reception of that beacon signal at the network entity and determining there from a distance that beacon signal has traveled;

compute the floor of the building where the network entity is located in response to the floor of the building of the plurality of base stations.

29. The computer readable medium of claim 28, further comprising program instruction configured to:

initiate an emergency call from the network entity to another network entity and append the networks entity's latitude, longitude, and floor of the building location to the emergency call.

* * * * *